United States Patent
Bodemann (10) Patent No.: US 9,242,131 B2
(45) Date of Patent: Jan. 26, 2016

(54) GAS PURGING VALVE FOR FIRE PROTECTION SYSTEM

(71) Applicant: South-Tek Systems, LLC, Raleigh, NC (US)

(72) Inventor: Timothy S. Bodemann, Raleigh, NC (US)

(73) Assignee: South-Tek Systems, LLC, Raleigh, NC (US)

( * ) Notice: Subject to any disclaimer, the term of this patent is extended or adjusted under 35 U.S.C. 154(b) by 0 days.

(21) Appl. No.: 14/277,366

(22) Filed: May 14, 2014

(65) Prior Publication Data
US 2014/0246103 A1 Sep. 4, 2014

Related U.S. Application Data (62) Division of application No. 12/718,653, filed on Mar. 5, 2010, now abandoned.

(60) Provisional application No. 61/169,974, filed on Apr. 16, 2009.

(51) Int. Cl.
| | | |
|---|---|---|
| *F16K 31/44* | (2006.01) | |
| *A62C 35/68* | (2006.01) | |
| *A62C 35/62* | (2006.01) | |
| *G01M 3/28* | (2006.01) | |
| *F16K 15/04* | (2006.01) | |

(52) U.S. Cl.
CPC ............... *A62C 35/68* (2013.01); *A62C 35/62* (2013.01); *F16K 15/04* (2013.01); *G01M 3/2815* (2013.01); *Y10T 137/0419* (2015.04); *Y10T 137/7722* (2015.04); *Y10T 137/7897* (2015.04)

(58) Field of Classification Search
CPC ............. F16K 31/44; Y10T 137/0419; Y10T 137/7722; Y10T 137/7897
USPC ........... 137/329.3; 251/82, 83, 66, 67, 72, 73, 251/12; 169/43, 17, 11
See application file for complete search history.

(56) References Cited

U.S. PATENT DOCUMENTS

| | | | |
|---|---|---|---|
| 4,527,587 A * | 7/1985 | Fairlamb ................ | 137/329.3 |
| 5,578,115 A * | 11/1996 | Cole ....................... | 96/121 |
| 6,960,321 B1 | 11/2005 | Ludwig | |
| 2006/0283877 A1 | 12/2006 | Bodemann | |
| 2010/0065287 A1 | 3/2010 | Burkhart et al. | |

FOREIGN PATENT DOCUMENTS

WO 2011162988 A2 12/2011

OTHER PUBLICATIONS

"Series ARV Thermoplastic Air Release Valves," Sep. 23, 2004, Plast-O-Matic Valves Inc. www.plastomatic.com/arv.html.*

* cited by examiner

Primary Examiner — Justin Jonaitis
(74) Attorney, Agent, or Firm — Coats & Bennett, PLLC (57) ABSTRACT

A gas purging valve is operative to be connected to piping in a Fire Protection System (FPS) and to bleed gas at a predetermined rate. The valve includes an inlet in gas flow relationship with the FPS piping and a central passage in gas flow relationship with the inlet. The valve also includes a calibrated orifice removeably disposed in the central passage, in gas flow relationship with the passage and operative to allow a maximum predetermined gas flow rate therethrough. The valve further includes an outlet in gas flow relationship with the calibrated orifice. A ball is disposed upstream of the central passage. The ball is operative to allow gas flow through the gas purging valve but operative to impede the flow of water through the gas purging valve.

4 Claims, 6 Drawing Sheets

GAS PURGING VALVE FOR FIRE PROTECTION SYSTEM

This application is a divisional filing of U.S. patent application Ser. No. 12/718,653, titled "System and Method for Fire Protection System Corrosion Mitigation," filed Mar. 5, 2010, which claims priority to U.S. Provisional Patent Application Ser. No. 61/169,974, titled, "The MICBlast™—Corrosion Inhibiting System for Fire Protection Systems (FPS)," filed Apr. 16, 2009, the disclosure of which is incorporated herein by reference in its entirety.

FIELD OF THE INVENTION

The present invention relates generally to fire suppression systems, and in particular to a gas purging valve useful in fire suppression systems.

BACKGROUND

Fire sprinkler systems are a well-known type of active fire suppression system. Sprinklers are installed in all types of buildings, commercial and residential, and are generally required by fire and building codes for buildings open to the public. Typical sprinkler systems comprise a network of pipes, usually located at ceiling level, that are connected to a reliable water source. Sprinkler heads are disposed along the pipes at regular intervals. Each sprinkler head includes a fusible element, or a frangible glass bulb, that is heat-sensitive and designed to fail at a predetermined temperature. Failure of the fusible element or glass bulb opens an orifice, allowing water to flow through the head, where it is directed by a deflector into a predetermined spray pattern. Sprinkler systems may suppress a fire, or inhibit its growth, thereby saving lives and limiting inventory loss and structural damage. Sprinkler specifications are published by the National Fire Protection Association (e.g., NFPA 13, 13D, 13R).

The sprinkler system (more generally, Fire Protection System, or FPS) is fed from a pump room or riser room. In a large building the FPS consist of several "zones," each being fed from a riser in the pump room. The riser contains the main isolation valve and other monitoring equipment (e.g., flow switches, alarm sensors, and the like). The riser is typically a 6 or 8 inch diameter pipe coupled through a booster pump (called the fire pump) to the main water supply to the building. The riser then progressively branches off into smaller "cross mains" and branch lines, also known as "zones". At the furthest point from the riser, typically at the end of each zone, there is an "inspector's test port," which is used for flow testing.

Many FPS are "wet" systems—meaning the sprinkler pipes in each room are full of water under a predetermined "internal set point" pressure. If the water pressure decreases below the set point, valves are opened and/or a pump is activated, and water flows into the sprinkler pipes in an attempt to maintain the pressure. The set point pressure drops when water escapes the system, such as due to the opening of a sprinkler head in a fire. However, the system may also be activated by a broken sprinkler head, or leaks in the system, such as leaks caused by corrosion of the pipes.

Due to the possibility of water discharge in other than actual fire conditions, a wet FPS present an unacceptable risk to sensitive equipment or merchandise in many applications. For example, a data center that houses expensive, mission-critical computing or telecommunications equipment; a semiconductor manufacturing facility; and a warehouse storing high-value, non-waterproof merchandise, are examples of facilities in which a wet FPS would be unacceptable. Also, areas subject to freezing temperatures cannot utilize wet FPS.

To address the need for FPS in areas where a wet FPS is not acceptable, alternatives to the wet FPS have been developed. These are of two general categories. Dry FPS are typically used in areas that are subject to freezing temperatures, where a water-filled system is not practical (e.g., parking garages, non-heated attics of motels and nursing homes, and the like). A dry FPS uses compressed air in the piping as a "supervisory gas." The air is maintained at a supervisory pressure, e.g., approximately 20 PSI. When a sprinkler head opens, the air pressure drops to atmospheric (e.g., 0 PSI), and a valve opens in response to the lower pressure. The valve locks in the open position and water rushes into the system. Dry FPS address the freezing problem, but present the same hazards of loss or damage to expensive equipment or merchandise as wet FPS, if the dry FPS is activated due to sprinkler head damage or failure, or a leak such as from corroded pipes.

Pre-Action FPS, also called a double interlock dry FPS, protects against water damage by increasing the probability that the system is only activated by an actual fire. A pre-action FPS operates similarly to a dry FPS; however, two or more action signals are required before water is injected into the system. A drop in supervisory air pressure alone will not activate the water isolation valve unless a second signal, such as a heat or smoke detector signal, is received by the control panel. At that point the isolation valve will open and water will rush into the zones with the aid of a booster pump called the fire pump.

Both dry and pre-action FPS must be hydro-tested after initial installation to make sure that the piping and hangers can support the additional weight of the water, and to make sure that the flow rate of water through the system conforms to applicable specifications (e.g., the NFPA 13 standard). Once it has passed all the tests, the system is drained and then filled with compressed air (supervisory gas). However, the FPS pipes never drain completely, and the residual water that remains creates ideal conditions for the initiation and propagation of corrosion in the piping either by means of galvanic or organic induced corrosion. Sometimes, microbes can grow in the water and accelerate the corrosion by means of the byproducts that they produce during their metabolic cycle. This is called Microbiologically Influenced Corrosion (MIC). Over time, MIC or galvanic corrosion can cause extensive damage to an FPS, as corrosion-induced leaks cause loss of supervisory gas, either arming (pre-action FPS) or activating (dry FPS) the system. Compressed air is used to maintain the supervisory pressure in both Dry and Pre-Action FPS, and this compressed air provides the oxygen that induces the galvanic corrosion and/or MIC, when the FPS is laden with residual water after draining from the hydrotesting.

Most real-world dry and pre-action FPS leak pressure. The allowable leak rate 1 PSI per 24 hours, per NFPA specifications. Conformance with this leak rate is tested following the hydro-testing, and if it is in compliance, the FPS is certified. From that point on, the supervisory gas leak rate only increases over time, due to dried out pipe coupler gaskets, fitting compounds (i.e., "pipe dope") drying out, and the like. In practice, most building owners are not concerned about the increased in leak rate until the air compressor providing the supervisory gas begins to cycle excessively to maintain the supervisory pressure. Eventually, it cannot maintain the required pressure, and the FPS will trigger an alarm, requiring that the leaks be found and sealed, or that a larger compressor be installed.

SUMMARY

According to one or more embodiments described and claimed herein, an inert gas Fire Protection System (FPS)

uses an inert gas rather than air in a dry or pre-action type FPS. The inert gas reduces or eliminates oxygen which in turn inhibits bacterial growth, and hence mitigates Microbiologically Influenced Corrosion (MIC) in the FPS piping. A zone purging valve having an inert gas purity analyzer is disposed at the end of each zone in the FPS. A controller over-pressurizes the FPS with inert gas, and bleeds the gas through the zone purging valves to a predetermined supervisory pressure. The zone purging valves can either be continuous, automatic with self over-pressurization relief, or controlled from the controller. The combination of the over-pressurization and bleeding through the zone purging valves ensures inert gas at the desired purity is maintained throughout the FPS. The purity of the inert gas is periodically measured in bleed operations, and pure inert gas is injected to maintain a predetermined purity level. Prior to converting a conventional FPS to an inert gas FPS, a pressure transducer and data logger measure the gas leak rate in the FPS piping, to accurately size the required inert gas generator or storage tank.

One embodiment relates to a gas purging valve operative to be connected to piping in a Fire Protection System (FPS) and to bleed gas at a predetermined rate. The valve includes an inlet in gas flow relationship with the FPS piping and a central passage in gas flow relationship with the inlet. The valve also includes a calibrated orifice removeably disposed in the central passage, in gas flow relationship with the passage and operative to allow a maximum predetermined gas flow rate therethrough. The valve further includes an outlet in gas flow relationship with the calibrated orifice. A ball is disposed upstream of the central passage. The ball is operative to allow gas flow through the gas purging valve but operative to impede the flow of water through the gas purging valve.

DETAILED DESCRIPTION

Figure 1:
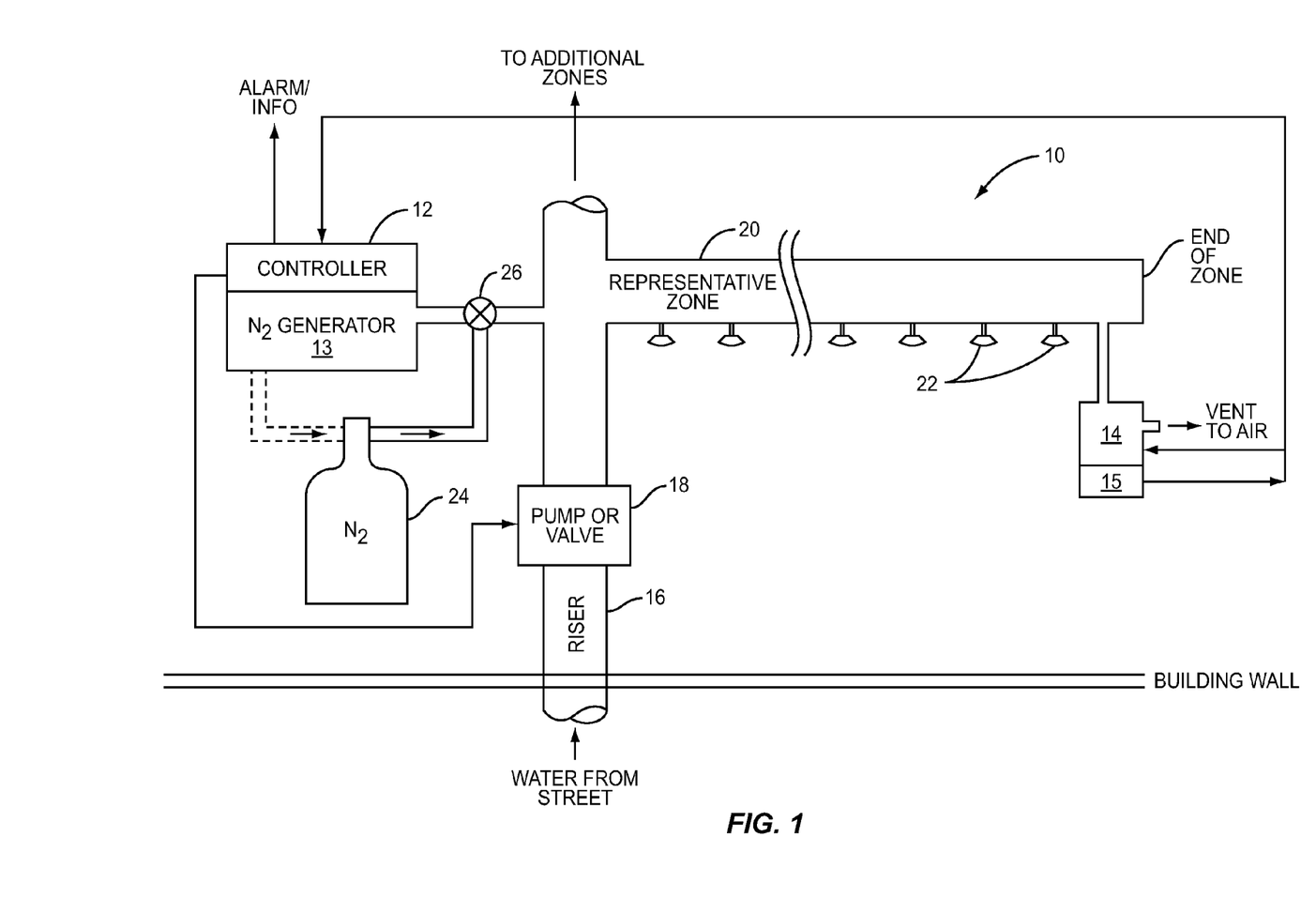
FIG. 1 is a functional block diagram of an inert gas Fire Protection System (FPS) according to one embodiment of the present invention.

FIG. 1 depicts a non-wet, inert gas Fire Protection System (FPS) 10, according to one embodiment of the present invention, which inhibits Microbiologically Influenced Corrosion (MIC) and/or galvanic corrosion and prevents or minimizes leaks to the system. The inert gas FPS 10 may be configured and operated as either a dry FPS or a pre-action FPS, as desired or required. The inert gas FPS 10 operates similarly to a conventional dry FPS or pre-action FPS, with the exception that the supervisory gas is not compressed air, but rather an inert gas that inhibits or retards galvanic corrosion and/or bacterial growth, and hence MIC. In a presently preferred embodiment, the inert gas is nitrogen ($N_2$), due to the ease and low cost of extracting high-purity nitrogen from ambient air. However, any non-reactive gas, such as helium, neon, argon, or the like, may be utilized within the scope of the present invention.

Nitrogen is an inert gas, having no oxygen component. By replacing the compressed air in a conventional dry or pre-action FPS with nitrogen, galvanic corrosion and bacterial growth is inhibited, which precludes the generation of metabolic byproducts that cause MIC. Additionally, nitrogen has a dew point of −40° F. (far below that of compressed air), meaning it can absorb water vapor at any higher temperature. By periodically purging and renewing the nitrogen in the FPS pipes, residual water from hydro-testing is evaporated and removed, virtually eliminating future corrosion due to galvanic corrosion or MIC in the FPS pipes.

Referring to FIG. 1, the distinguishing features of the inert gas FPS 10 comprise a controller 12, which may include a nitrogen generator 13, and one or more zone purging valves 14, preferably located proximate to the end of each FPS zone 20 pipe on or near an FPS Inspector's Test Port (not shown). Each zone purging valve 14 can either be continuously vented, have a self-limiting automatic vent with over-pressurization relief, or can be controlled by the controller 12 via a wired or wireless connection. In one embodiment, at least one zone purging valve 14 per zone 20 may include a gas purity analyzer 15, as described in greater detail herein. The water distribution portion of the inert gas FPS 10 is conventional, comprising a riser 16 receiving water from a reliable source, a fire pump or valve 18, and one or more zones 20 branching off from the riser 16. Sprinkler heads 22 are disposed at regular intervals along the zone 20 piping.

The controller 12 controls the overall system 10 operation, receiving input from one or more supervisory pressure sensors (not shown), and in the case of a pre-action type system 10, also receiving a secondary fire alarm, such as from a smoke detector or heat sensor (not shown). The controller 12 preferably includes a nitrogen generator 13 operative to extract nitrogen gas from atmospheric air. A suitable nitrogen generator 13 is the MICBlast™ FPS Nitrogen Generator, available from South-Tek Systems of Wilmington, N.C. Reserve nitrogen may be generated and stored in a tank 24. In one embodiment, for example in a small building with only one or a few zones 20, the controller 12 may not include the nitrogen generator 13, but may alternatively operate using nitrogen (or other inert gas) supplied from a tank 24. In either case, the controller 12 injects an inert gas into the riser 16 and/or zones 20, such as through an isolation valve 26, downstream of the fire pump or valve 18. The inert gas is maintained at a supervisory pressure and monitored, in conformance with all NFPA (and other) specifications. If the controller 12 detects a drop in supervisory pressure—and additionally, in the case of a pre-action type system 10, it receives a secondary fire alarm—the controller 12 shuts off the inert gas isolation valve 26 and activates the fire pump or valve 18 to flood the zones 20 with water.

Figure 2:
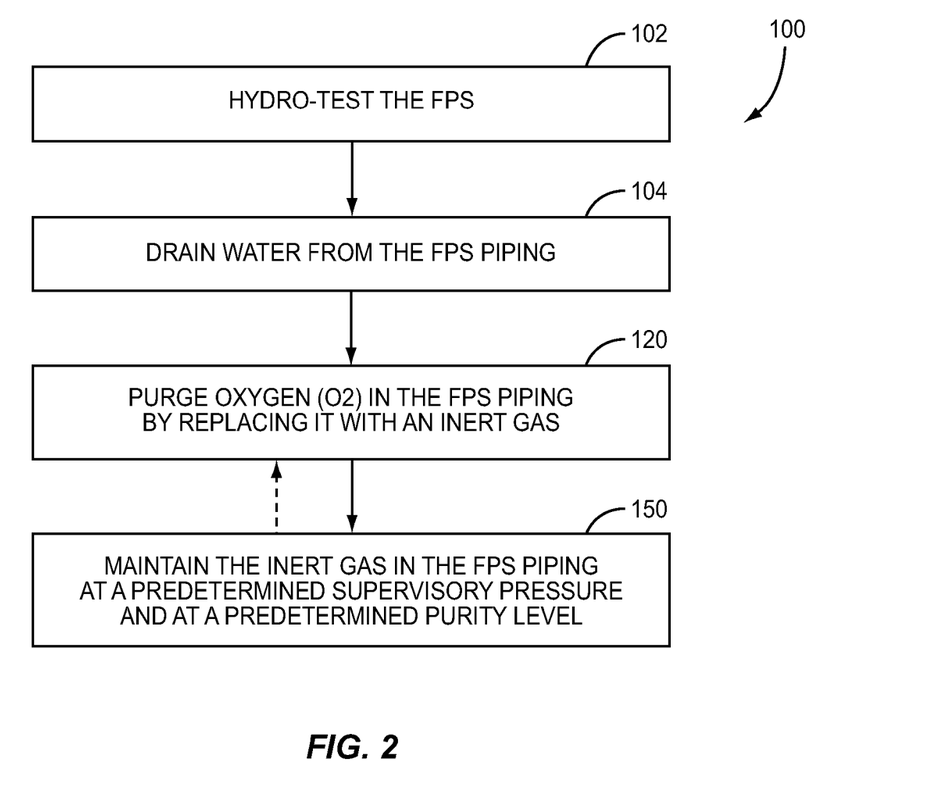
FIG. 2 is a flow diagram of a method of inhibiting corrosion in FPS piping.

An overall method 100 of inhibiting corrosion in fire protection system piping is depicted in FIG. 2. The inert gas FPS 10 is hydro-tested according to all applicable standards, with all concomitant testing and certification activities (block 102). Water is drained from the FPS 10 piping (block 104), and oxygen is purged from the FPS 10 piping by replacing it with an inert gas (block 120). This operation is further elaborated below, with reference to FIG. 3. The inert gas is then maintained in the FPS 10 piping at a predetermined supervisory pressure and at a predetermined purity level (block 150). This operation (which may require reapplication of block 110, as indicated by the dashed line) is further elaborated below, with reference to FIG. 4.

Figure 3:
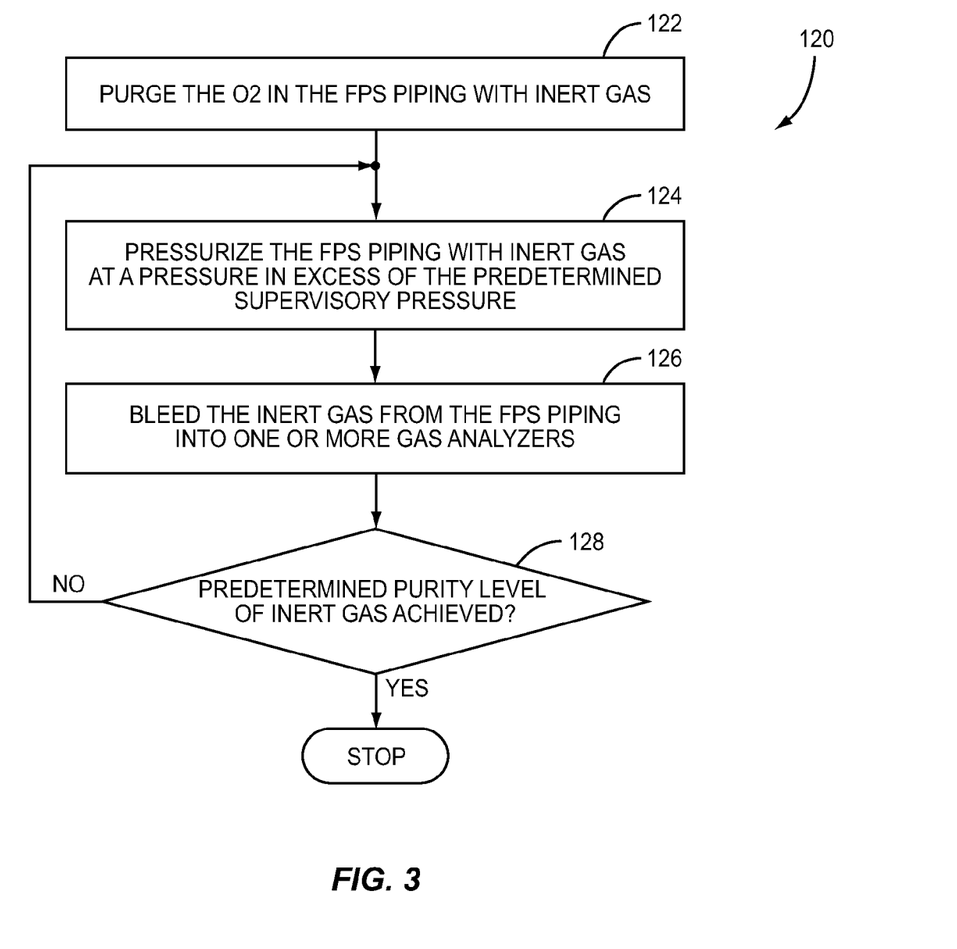
FIG. 3 is an elaboration of block 120 of FIG. 2.

FIG. 3 elaborates block 110 of the method 100 depicted in FIG. 2. Oxygen is initially purged from the FPS piping by replacing it with an inert gas (block 112). The inert gas is injected into the FPS piping until the inert gas reaches a pressure (e.g., 30-40 PSI) in excess of the predetermined supervisory pressure (e.g., 15-20 PSI) by a predetermined amount (block 114). The inert gas is then bled (block 116) from one or more zone purging valves 14 (see FIG. 1). At least one of the zone purging valves 14 includes a gas purity analyzer 15 (e.g., nitrogen purity analyzer) operative to measure (directly or indirectly) the purity of inert gas being bled from the associated zone purging valve 14. In one embodiment, the gas purity analyzer may comprise an oxygen sensor, which measures the purity of inert gas by the reduction or elimination of oxygen. The purity analyzer 15 reports the measured purity of inert gas, via a wired or wireless connection, to the controller 12. If the predetermined purity level of inert gas has not been achieved (block 118), the FPS piping is again over-pressurized (block 114), and bled (block 116). When the purity analyzer 15 reports that the inert gas being bled at the zone 20 end has achieved the predetermined purity level (block 118), the controller 12 closes the zone purging valves 14 (block 120). Achieving a predetermined purity level of inert gas (e.g., 99% pure nitrogen) ensures that effectively no oxygen remains in the system to support bacterial growth. Additionally, the bleed process of achieving the predetermined inert gas purity removes water vapor from the FPS piping, which has evaporated into the inert gas from residual pools left from hydro-testing.

Figure 6A:
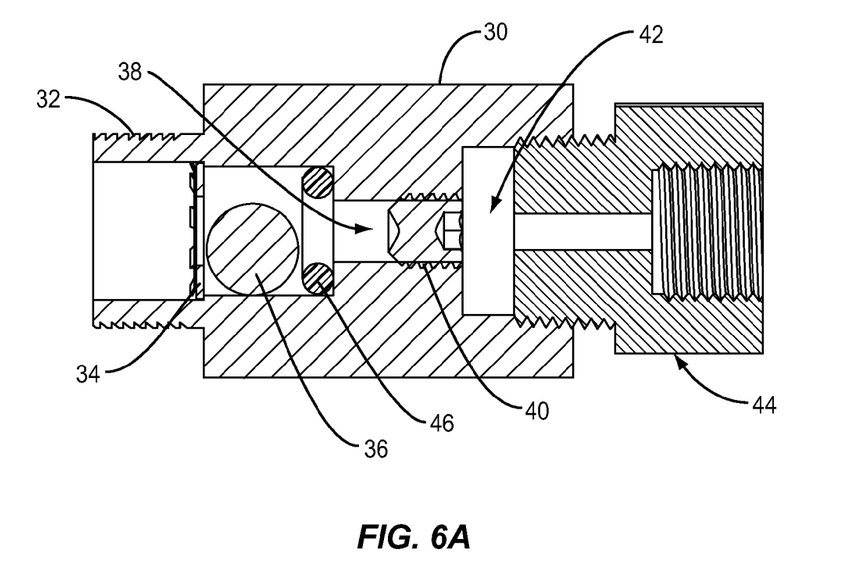
FIGS. 6A and 6B are sectional views of a continuous leak valve.
Figure 6B:
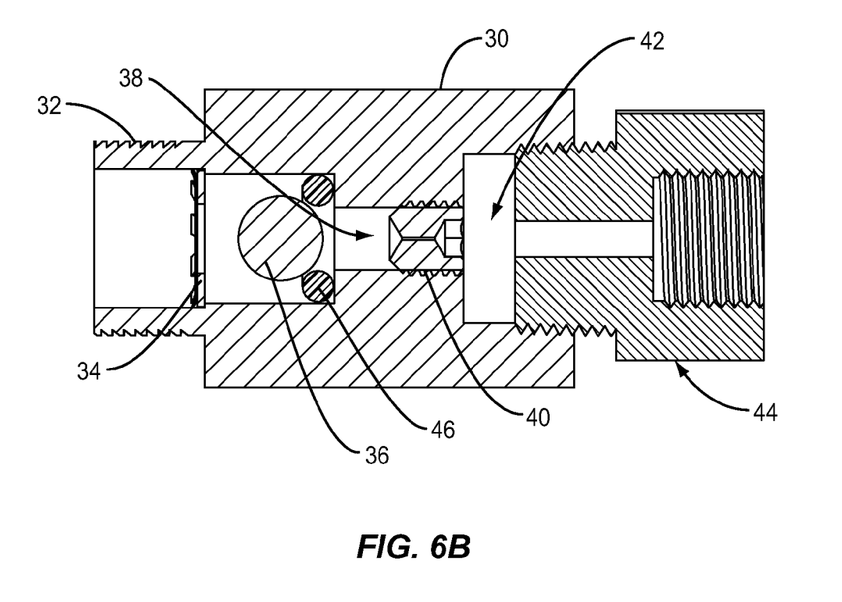

In one embodiment, the cycling of over-pressurization and bleeding is accomplished with a zone purging valve 14 having a predetermined constant purge level, wherein actuation of the purging valve 14 by the controller 12 is not required. One suitable such zone purging valve 14 is the AutoPurge System™ (APS) 30, depicted in sectional views in FIGS. 6A-B, available from South-Tek Systems of Wilmington, N.C. The APS 30 comprises a standard threaded coupling 32 on an inlet, by which the APS 30 may be mounted to the FPS piping, such as via an Inspectors Test Valve. A retaining clip 34 retains a ball 36 within the inlet. In an inactive state, as depicted in FIG. 6A, the ball 36 allows gas to pass through a central passage 38 of the APS 30 and through a calibrated orifice 40. The orifice 40 is preferably easily removed (e.g., threaded) and may be sized, in terms of flow rate, for each FPS system 10. For example, the orifice 40 in each APS 30 may be sized to continuously purge gas such that the overall FPS system 10 loses pressure at a rate below the NFPA maximum leak rate of one PSI per twenty-four hours. Gas passing through the calibrated orifice 40 is discharged from the exit bore 42.

In one embodiment, the exit bore 42 is threaded, and accepts an adaptor 44. The adaptor 44 may be sized to accept a gas purity analyzer 15, such as the portable Quick-Check™ Nitrogen Purity Sensor available from South-Tek Systems of Wilmington, N.C., or a permanent gas purity analyzer 15, which may have a wired or wireless connection to the controller 12. When water is pumped into the FPS system 10, the APS 30 assumes an active state, depicted in FIG. 6B, in which water pressure forces the ball 36 to seat against an o-ring 46. This closes off the central passage 38, preventing the water from leaking out of the APS 30.

Figure 4:
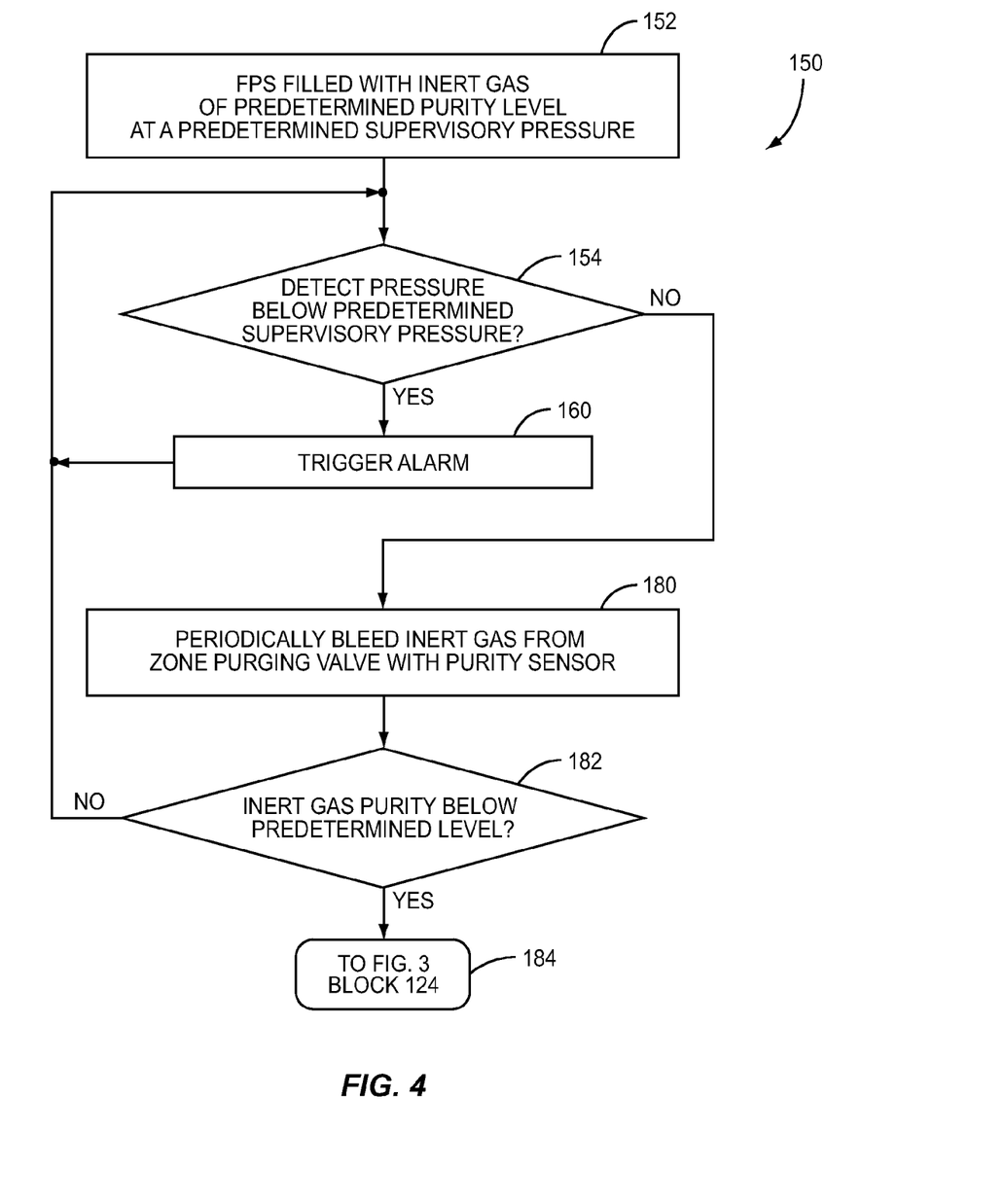
FIG. 4 is an elaboration of block 150 of FIG. 2.

FIG. 4 elaborates block 150 of the method 100 depicted in FIG. 2. Once the predetermined purity level of inert gas has been achieved, the inert gas is maintained in the FPS piping at a predetermined supervisory pressure and at the predetermined purity level, even in the face of minor leaks in the FPS fittings, couplings, and the like. The maintenance operation 150 begins with the inert gas FPS 10 piping filled with inert gas of a predetermined purity level at a predetermined supervisory pressure (step 152). If the controller 12 detects an inert gas pressure below the predetermined supervisory pressure (block 154), an alarm is triggered (block 160), and a signal may additionally be communicated by the controller 12 to, e.g., a Building Management System (BMS). Block 160 is further elaborated below, with reference to FIG. 5. If the inert gas pressure is maintained at the predetermined supervisory pressure (block 154), i.e., there are no leaks in the FPS 10, the controller 12 periodically (e.g., every few days) bleeds a sufficient volume of gas through at least one zone purging valve 14 having a gas purity analyzer 15, to measure the purity of the inert gas (block 180). If the measured purity of the inert gas is below the predetermined purity level (block 182), pure inert gas is injected into the system, following the method described above, beginning with block 114 of FIG. 3.

Figure 5:
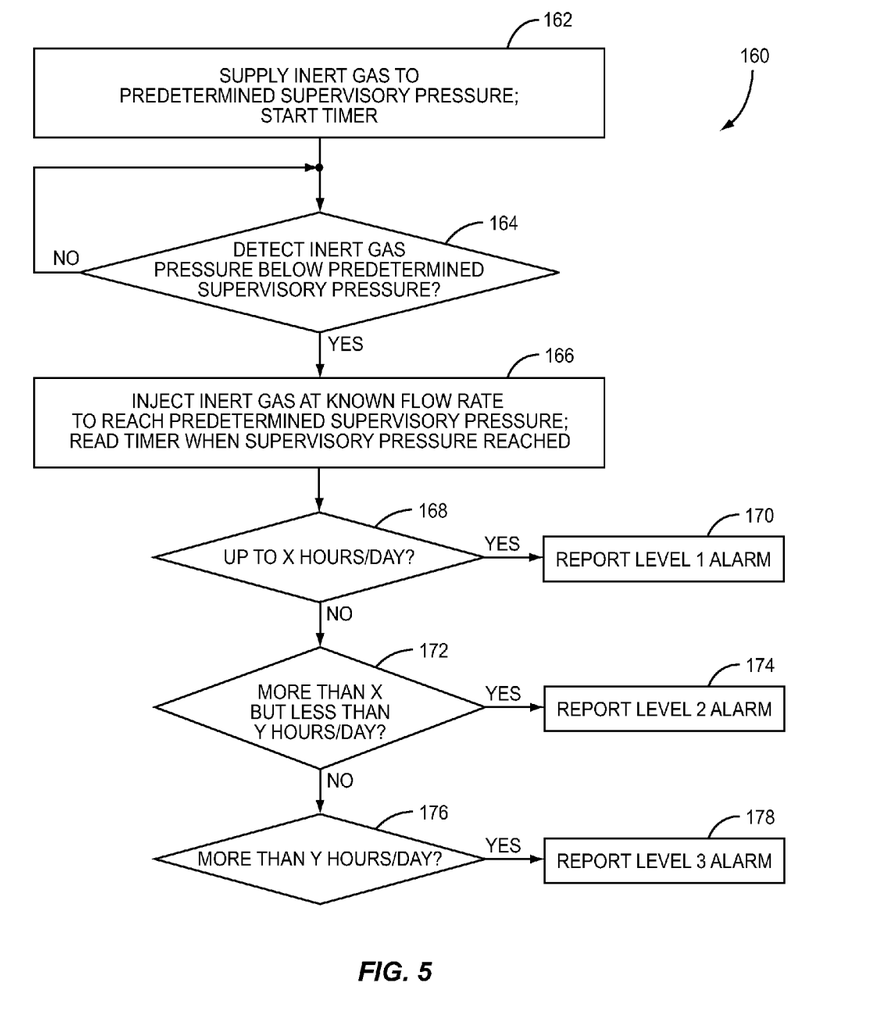
FIG. 5 is an elaboration of block 160 of FIG. 4.

In practice, there are different levels of inert gas leaks, raising different levels of concern. In one embodiment, a plurality of distinct alarms is generated and reported, based on the severity of the detected leak. FIG. 5 depicts a method 160 of quantifying detected leaks, and reporting different alarms based on the severity of the leaks. To quantify the leak severity, the inert gas in the FPS 10 is brought up to the predetermined supervisory pressure and a timer is initialized and started (block 162). The controller 12 monitors the pressure in the FPS 10. When a pressure below the supervisory pressure is detected (block 164), the controller 12 injects inert gas into the FPS 10 piping, and reads the timer when the predetermined supervisory pressure is again achieved.

Based on the value of the timer (i.e., the time required to reach the predetermined supervisory pressure at a known flow rate of fresh inert gas), one of several levels of alarm is generated. In one embodiment, if the controller 12 injects inert gas for less than x hours per day to maintain the predetermined supervisory pressure, a level 1 alarm is reported, e.g., to the BMS. A level 1 alarm indicates a slow leak, which may not be of concern. If the controller 12 must inject inert gas for more than x hours per day, but less than y hours/day, a level 2 alarm is generated and reported. A level 2 alarm indicates a significant leak above the acceptable level, but which does not adversely impact the functionality of the inert gas FPS 10. A leak causing a level 2 alarm should be addressed soon. If the controller 12 must inject inert gas for more than y hours per day—up to an including continuous operation—a level 3 alarm is generated. A level 3 alarm indicates a catastrophic leak that may affect the ability of the inert gas FPS 10 to function properly. A level 3 alarm must be addressed immediately.

The values for the variables x and y may be readily determined by those of skill in the art for each installed system, and will generally vary based on the total volume of FPS 10 piping, the inert gas injection flow rate, and will include a subjective factor as to where to draw the lines between acceptable, significant, and catastrophic leaks. Also, the units for x and y described above—hours per day—assume a controller 12 with a nitrogen generator 13 and no reserve storage tank 24, and indicate the time that the nitrogen generator 13 must run. When the inert gas is supplied from a tank 24 of compressed gas, the duration variables x and y may refer to the time the isolation valve 26 is open, and may be, e.g., minutes per day, minutes per hour, or other appropriate unit.

Of course, while the embodiment described above and in FIG. 5 uses two threshold variables x and y, and reports three levels of leak severity alarm, other embodiments may use any number of threshold variables, and may report any number of levels of leak severity alarm, as desired or required for any particular installation. In general, the controller 12 may be easily programmed to generate and report the desired leak alarms. Also, the use of a timer in the description of the alarm method 160 is only to describe functionality—in practice, the duration of inert gas injection may be measured in numerous ways. Furthermore, the total volume of gas injected may be measured in lieu of the duration of injection at a known flow rate, and appropriate alarm levels may be set accordingly. All such variations fall within the scope of the present invention.

The inert gas FPS 10 of the present invention may be implemented on existing dry or pre-action FPS systems. As mentioned above, most such systems leak air. Building owners are generally not concerned about such leaks, until the air compressor providing the supervisory gas begins to cycle excessively to maintain the supervisory pressure. However, when the air compressor is replaced with an inert gas source 13, 24 and the controller 12, gas leaks in the FPS piping become much more costly (so long as the inert gas is more expensive to replace than air, which is generally the case).

In one embodiment, the gas leak rate of an existing dry or pre-action FPS is determined, in order to determine the appropriate size nitrogen generator 13. The existing FPS has a supervisory pressure air compressor, with an accumulator tank, plumbed into the FPS piping. The air compressor pressurizes the FPS piping to a predetermined supervisory pressure. As air leaks from the FPS piping, the pressure decreases. When the FPS piping pressure drops to a predetermined trigger pressure, the air compressor automatically starts up, and re-pressurizes the FPS to the predetermined supervisory pressure.

To measure the gas leak rate, a pressure transducer is installed in the FPS piping, or may be connected to a supervisory pressure air compressor accumulator tank. The pressure transducer is connected to a data logger, which records the pressure in the FPS piping. As the air compressor runs the FPS piping pressure (and that in the air compressor accumulator tank) to the required supervisory pressure and shuts off, and as the pressure within the FPS piping (and that in the air compressor accumulator tank) decreases due to leaks, the pressure variations vs. time are recorded. By knowing the output of the air compressor (e.g., in cubic feet per minute, or CFM), the FPS piping leak rate (also in CFM) can be easily calculated. Based on this existing leak rate, the size of a nitrogen generator 13 (or inert gas storage tank 24) required to provide sufficient flow to overcome the leak rate and maintain the required supervisory pressure with inert gas may be calculated.

In one embodiment, the pressure transducer may be attached to an existing FPS at a test port that includes a ball valve. The pressure transducer is screwed into the pipe fitting right after the existing ball valve, and the ball valve is then opened to allow the transducer to sense the FPS piping pressure. The pressure transducer may attach via a wired connection to a portable, battery operated data logger. Alternatively, the pressure transducer may connect via a wired or wireless link to a 110V data logger that is plugged into a convenient outlet. The FPS is automatically monitored for, e.g., 4 to 7 days, during which time the air compressor may cycle numerous times. Based on the data accumulated during this period, the FPS leak rate may be determined, given the flow rate of the air compressor. Knowledge of the existing FPS leak rate is important in selecting an inert gas source 13, 24. If, for example, a nitrogen generator 13 is selected that is too small, it will be unable to achieve or maintain the predetermined supervisory pressure. On the other hand, if too large a nitrogen generator 13 is selected, the building owner pays a higher cost than is required.

In one embodiment, as described above, the controller 12 is a stand-alone unit operative to control the inert gas FPS 10. For example, the controller 12 may comprise a computerized unit based on a general purpose microprocessor, Digital Signal Processor (DSP), or the like, programmed with software operative to implement the described control functions. Alternatively, the controller 12 may comprise a custom control unit based on a state machine, programmable logic and associated firmware, or the like. The controller 12 as a stand-alone unit may include a user interface such as a terminal having a keyboard and display, or inputs in the form of switches and/or a keypad, and outputs in the form of lights, audible alerts, and the like. In one embodiment, the controller 12 may be integrated with a building's BMS or fire alarm panel. As such, the controller 12 may perform continuous monitoring of inert gas pressure and purity, as described above. In all embodiments, the controller 12 receives input from various sensors (pressure sensors in each zone 20, smoke detectors, the purity analyzers 15, and the like) and outputs control signals (to the zone purging valves 14, the fire pump or valve 18, the isolation valve 26, any inert gas storage tank 24, and the like) as well as alarm outputs and system information output to a BMS or fire panel. Any or all of these control and communication links may be wired or wireless, using any known or newly developed protocols (e.g., RS-232, IEEE-488, IEEE-1394, USB, Ethernet, IEEE 802.11, Bluetooth, or the like).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A gas purging valve operative to be connected to piping in a Fire Protection System (FPS) and to bleed gas at a predetermined rate, comprising:
   an inlet in gas flow relationship with the FPS piping;
   a central passage in gas flow relationship with the inlet;
   a calibrated orifice removeably and replaceably disposed within the central passage, such that the calibrated orifice may be removed from the central passage, and a differently sized calibrated orifice disposed within the central passage, the calibrated orifice being in gas flow relationship with the passage and operative to allow a maximum predetermined gas flow rate therethrough wherein the calibrated orifice determines the maximum gas flow rate through the gas purging valve;
   an outlet in gas flow relationship with the calibrated orifice; and
   a ball disposed upstream of the central passage, the ball operative to allow gas flow through the gas purging valve but operative to impede the flow of water through the gas purging valve.

2. The valve of claim 1 further comprising an o-ring disposed upstream of the central passage, the o-ring sized and positioned such that water pressure at the inlet urges the ball against the o-ring, sealing the central passage against water flow therethrough.

3. The valve of claim 2 wherein the ball and the o-ring are disposed in the inlet.

4. The valve of claim 1 wherein the outlet is adapted to be connected to a gas purity analyzer.

* * * * *